United States Patent [19]
Giorgetti et al.

[11] Patent Number: 5,312,167
[45] Date of Patent: May 17, 1994

[54] BYPASS VALVE-DELAY VALVE ASSEMBLY FOR BRAKING SYSTEMS

[75] Inventors: Alberto Giorgetti; Luigi Cavestro; Roberto Lavezzi, all of Curno, Italy

[73] Assignee: Brembo S.p.A., Bergamo, Italy

[21] Appl. No.: 923,303

[22] Filed: Jul. 31, 1992

[30] Foreign Application Priority Data

Sep. 5, 1991 [IT] Italy ............ BG91A000031

[51] Int. Cl.$^5$ .................................................. B60T 13/74
[52] U.S. Cl. .................................... 303/3; 303/9.61; 303/15; 137/599; 188/156
[58] Field of Search ............ 303/3, 15, 9.61, 84.1, 303/119.2; 188/159, 164, 156; 137/599; 318/370, 371, 372; 41/6

[56] References Cited

U.S. PATENT DOCUMENTS 3,589,391 6/1971 Pagliaro ............ 137/599 X
4,005,759 2/1977 Farr ...................... 303/3 X Primary Examiner—Robert J. Oberleitner
Assistant Examiner—Lee W. Young
Attorney, Agent, or Firm—Bucknam and Archer

[57] ABSTRACT

A bypass valve-delay valve assembly for an electric-hydraulic braking system of an electrically driven vehicle which includes a bypass valve section in which the hydraulic braking circuit ducts are obstructed by a solenoid operated valve activated by an electric signal generated by brake pedal depression, and a delay valve section in which the hydraulic fluid is obstructed by a delay valve arranged in a regulator piston whose maximum stroke equals the pressure corresponding to the maximum energy recovery performance generated by the electric drive motors' braking action. Pressure exceeding the maximum energy recovery performance of the drive motors causes the delay valve to open adding hydraulic braking to the electric drive motor braking.

6 Claims, 1 Drawing Sheet

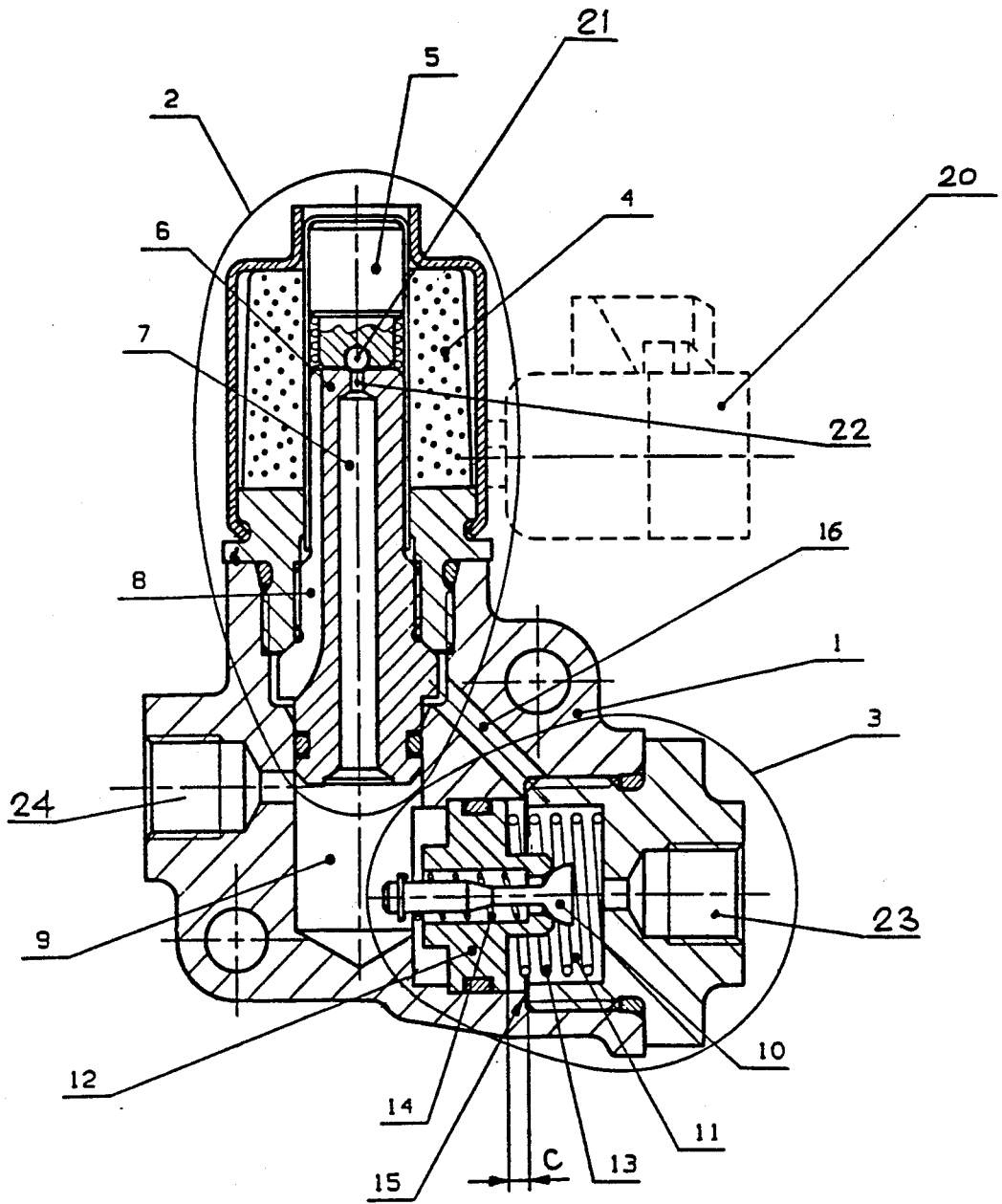

BYPASS VALVE-DELAY VALVE ASSEMBLY FOR BRAKING SYSTEMS

BACKGROUND OF THE INVENTION

1. Field of the Invention

This invention refers to a bypass valve-delay valve set for braking systems. More specifically, this invention refers to a bypass valve-delay valve assembly for a mixed electric-hydraulic braking system to be fitted to electrically driven vehicles.

2. Description of the Prior Art

For electrically driven vehicles such as, for example, ecological vehicles for cities and the like, mixed braking systems are currently being studied and applied in which, together with the hydraulic braking circuits of the traditional type, electrical braking devices are fitted whose operation, with the exclusion of conditions at speeds below that of the presence of electrical torque, takes precedence over the former. This is to fully recover the energy output by the electric motors at the time when a request for braking is made, and to exploit it for recharging the batteries, which allows the range of the vehicles to be increased economically.

The hydraulic circuits are fitted with bypass valves and hydraulic valves so that they can work in this way. The function of the bypass valves is to exclude said hydraulic circuits when the electrical braking systems can be exploited to the full and that of the delay valves is to also start up the hydraulic braking, in a modulated way, in addition to he electrical braking action when same has reached its maximum capacity. See the applicant's co-pending application entitled "Braking System For Electrically Drive Vehicles", U.S. Ser. No. 07/919, filed Jul. 23, 1992. These two types of valve are generally separate and bulky.

SUMMARY OF THE INVENTION

The object of this invention is to provide a single bypass valve-delay valve assembly for a mixed electric-hydraulic braking system which allows the functional and sequential operating requirements of said electric and hydraulic braking systems to be achieved.

A further object of this invention is to provide a single bypass valve-delay valve assembly for a mixed electric-hydraulic braking system which is functional, rational, efficient, economic and of very limited size.

According to this invention, these and other objects are attained by means of a bypass valve-delay valve assembly which includes: an initial bypass section in which the hydraulic braking circuit activating fluid passage ducts are intercepted by means of the approach or withdrawal movement between a moving core and a fixed core, caused by a solenoid actuated by electric signals coming from a control centre; and a second section in which the hydraulic circuit activating fluid is intercepted by a delay valve which is located on a floating regulator piston whose maximum stroke is the same as the pressure which corresponds with the maximum energy recovery performance derived from the braking action of the electric drive motors.

Closing the bypass in the first section corresponds with the total interception of the hydraulic braking circuit and total insertion of the energy recovery braking action generated by the electric drive motors.

The opening of the delay valve occurs when braking requests greater than those which can be output by the aforementioned motors are received; the increase in the pressure of the operating fluid causes the modulated opening of the delay valve and the pressure increase in the hydraulic circuit generates an increase in the braking action of said circuit, which is added to that generated by said electric motors.

BRIEF DESCRIPTION OF THE DRAWINGS

The constructional and functional characteristics of the bypass valve-delay valve assembly of this invention can be better understood from the following description, in which reference is made to the figures in the appended drawing which shows the plan view of the transverse section of one of its embodiments, given only as an illustrative but not limitative example.

BRIEF DESCRIPTION OF THE PREFERRED EMBODIMENT

The bypass valve-delay valve assembly for braking systems, specifically for mixed electric-hydraulic braking systems for electrically driven vehicles, of this invention, comprises a single body (1) which is basically divided into two separate sections: a bypass valve one, shown and defined by the continuous line (2) and a delay valve one, shown and defined by the continuous line (3).

The two sections (2,3) are arranged in such a way that the axes of the respective bypass and delay valves are perpendicular to each other.

The bypass section (2) includes: a solenoid (4), which can be actuated electrically through an electrical connector (20) by means of a control centre (30) a fixed core (6) fitted with a central duct (7) and a moving core (5) fitted with a ball valve (21). The fixed (6) and the moving (5) cores are coaxial with each other and with the solenoid (4) into which they are fitted.

The control centre can, for example, be activated by an electric signal coming from the stop-light switch (32), activated by the brake pedal (34).

Whenever the brakes are applied the control centres are actuated and send an electric signal to the solenoid (4), which is also actuated, so that the moving core (5) of the bypass valve, or isolator, is made to approach the fixed core (6) until, using the ball shutter (21), it closes the passage (22) which links duct (7) with duct (8).

Thus the hydraulic braking circuit is isolated from the pump or master control cylinder (36). At the same time said pump sends fluid to the inlet chamber (9). The aforementioned flow, being unable to exit duct (7), which is blocked, is intercepted by a small delay valve (10), closed, and the overpressure which is created in the chamber (9) operates on the surface of a float (12), moving it (towards the right in the figure). The movement of the float (12) directs the fluid into the rear chamber (11), towards the outlet (23) and thence to the brakes (38), approaching the pads (40) to the discs (42) or the shoes to the drums, and thus performing the so-called idle stroke or taking-up the braking clearance.

In these conditions the braking action is solely achieved from the energy recovery of the electric drive motors whose torque is inverted via the commands transmitted by the control centres.

The overpressure which is created in the aforementioned inlet chamber (9), resulting from the arrival of the fluid directed to it by the control pump or master cylinder (36), through the entry (24), is balanced by a counteracting spring (13) which is calibrated in such a way that the float (12) reaches its striking position against the shoulder (15) at a pressure coinciding with the maximum energy recovery performance, namely electric braking, of the electric drive motors.

The counteraction of the spring (13) allows the action on the brake pedal to be modulated throughout the whole phase of electric braking only.

Thus the stroke "C" of the float (12) is such that the fluid moved from the chamber (11) to the brakes is, as has been said, adequate and sufficient to take-up the braking clearance so that the pads approach the discs or the shoes approach the drums without, however, providing a braking action.

In this way the fluid accumulating in the chamber (9) also allows the control pedal (34) travel to be modulated during electric braking.

If the braking action produced by the electric motors is adequate, the system remains in equilibrium in the aforementioned way until braking is completed.

Should an increase in braking be required, on increasing the action on the brake pedal (34), there is a corresponding increase of pressure in the chamber (9) which forces the delay valve (10) to open. This opening allows the passage of the fluid from said chamber (9) to the rear chamber (11).

In this phase the counteracting spring (13) does not increase its action since the float (12) is already striking against the shoulder (15).

With the passage of the fluid from the chamber (9) to the rear chamber (11) there is an increase of pressure in this latter and at the exit (23) with consequent increase in the braking action of the hydraulic system which will be added to the electric braking action.

Thus a pressure equal to that present in the chamber (9), decreased by the delta-pressure corresponding to the calibration of a counteracting spring (14) acting on the shaft of the delay valve (10), reaches the hydraulic braking system.

The braking action will be stabilized depending on the deceleration that it is required to obtain and can be modulated in every phase of the braking. When the speed of the vehicle falls below a minimum value corresponding to the condition in which the electric motors are no longer able to output a braking torque, the aforementioned control centres deactivate the solenoid (4) and the moving core (5) withdraws from the fixed one (6), the ball (21) frees the passage (22) and communication is restored between ducts (7) and (8). In this way the chamber (9) and the rear chamber (11) are put into communication through ducts (7), (8) and (16) and the full pressure present in the chamber (9) is discharged into the rear chamber (11), and thence to the brakes.

This pressure increase on the brakes compensates for the braking action of the electric drive motors as soon as it starts to fail. With the balance of the pressure, the counteracting spring (13) pushes the float (12) into its original position and the spring (14) recloses the delay valve (10).

On releasing the brake pedal, pressure in the chamber (9) falls and the fluid present in the braking system is discharged, in reverse, through the previously described ducts (16), (8) and (7).

At the end the whole complex has returned to its original conditions, ready for the next application of the brakes. In the case in which electric braking with energy recovery by the electric motors is not present, or in the case of the absence of electrical energy, and thus the impossibility for the corresponding controls to operate, independently of speed, the solenoid (4) is not actuated and, consequently, the passage between chambers (9) and (11) remains open, the fluid flows regularly and the normal hydraulic braking system is available.

We claim:

1. A bypass-delay valve assembly for an electric-hydraulic braking system of an electrically drive vehicle having a brake pedal which generates an electrical signal and controls hydraulic pressure through a master cylinder in the electric-hydraulic braking system when depressed and wherein the system includes a hydraulically operated friction brake having a braking clearance, said bypass-delay valve assembly comprising:

a unitary valve body having an entry chamber communicating with the master cylinder and an exit chamber communicating with the hydraulically operated friction brake;

a bypass section in the valve body including a fixed core having a central duct, a movable core coaxial with said fixed core and having a ball shut valve for shutting said central duct, a solenoid for moving said movable core activated by an electrical signal generated by the brake pedal, so that when activated the solenoid moves the movable core to close the central duct of the fixed core by means of the ball shut valve;

a delay section in the valve body including a movable piston disposed between said entry and exit chambers, biasing means biasing said piston towards said entry chamber, shoulder means disposed between said movable piston and said exit chamber for limiting the maximum stroke of said piston, and a delay valve with biasing means arranged in said piston for modulated communication between said entry and exit chambers.

2. The bypass-delay valve assembly as defined in claim 1, wherein the central duct of the fixed core of the bypass section communicates with said entry chamber.

3. The bypass-delay valve assembly as defined in claim 1, wherein the central duct of the fixed core of the bypass section communicates between said entry and exit chambers so that the ball shut valve interrupts communication therebetween when said solenoid is activated and communication is uninterrupted when said solenoid is deactivated.

4. The bypass-delay valve assembly as defined in claim 3, wherein upon depression of the brake pedal and operation of the electric braking system up to its maximum energy recovery possibility, the ball shut valve of the bypass section is closed shutting the central duct thereof and the delay valve of the delay section is closed so that communication between the entry and exit chambers is interrupted.

5. The bypass-delay valve assembly as defined in claim 4, wherein during further increased braking as a result of increased pressure on the brake pedal and thus increased hydraulic pressure in the electric-hydraulic braking system, the electric braking effect is augumented by the increased hydraulic pressure in the entry chamber opening the delay valve in the delay section against the bias thereon so that modulated communication exists between the entry and exit chambers.

6. The bypass-delay valve assembly as defined in claim 1, wherein the maximum stroke of the delay section piston away from the entry chamber displaces sufficient hydraulic fluid towards the brakes to take up the braking clearance thereof.

* * * * *